United States Patent
Yin et al.

(10) Patent No.: US 10,970,325 B2
(45) Date of Patent: Apr. 6, 2021

(54) HYBRID ENTITY MATCHING TO DRIVE PROGRAM EXECUTION

(71) Applicant: Microsoft Technology Licensing, LLC, Redmond, WA (US)

(72) Inventors: Qiannan Yin, Sunnyvale, CA (US); Songtao Guo, Cupertino, CA (US); Yi Wang, Sunnyvale, CA (US); Albert Cui, Palo Alto, CA (US); Joonhyung Lim, San Mateo, CA (US); Qunzeng Liu, Sunnyvale, CA (US); Lizabeth Li, Mountain View, CA (US); Carrie Peng, San Jose, CA (US); Yang Zhou, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 59 days.

(21) Appl. No.: 16/232,326

(22) Filed: Dec. 26, 2018

(65) Prior Publication Data

US 2020/0210466 A1   Jul. 2, 2020

(51) Int. Cl.
*G06F 7/00* (2006.01)
*G06F 16/35* (2019.01)
(Continued)

(52) U.S. Cl.
CPC ............ *G06F 16/35* (2019.01); *G06F 16/313* (2019.01); *G06K 9/6215* (2013.01); *G06N 20/00* (2019.01); *H04L 51/18* (2013.01)

(58) Field of Classification Search
CPC ....... G06F 16/35; G06F 16/313; G06N 20/00; G06K 9/6215; H04L 51/18

(Continued)

(56) References Cited

U.S. PATENT DOCUMENTS

2019/0171655 A1* 6/2019 Psota .................... G06F 16/285

OTHER PUBLICATIONS

Papadakis et al., "Comparative Analysis of Approximate Blocking Techniques for Entity Resolution", VLDB Endowment, vol. 9, No. 9, dated 2016, 12 pages.

* cited by examiner

*Primary Examiner* — Isaac M Woo
(74) *Attorney, Agent, or Firm* — Hickman Becker Bingham Ledesma LLP; Christine E. Orich

(57) ABSTRACT

In an embodiment, the disclosed technologies include receiving a set of digital inputs; where the set of digital inputs includes a candidate entity-member entity pair that includes candidate entity data and member entity data; where the member entity data has been extracted from a node of an online service; where an exact match has not been found between the candidate entity data and the member entity data; in response to the set of digital inputs, outputting models of the candidate entity data and the member entity data, respectively; where the models indicate weight values assigned to text in the candidate entity data and weight values assigned to text in the member entity data, respectively; calculating a similarity score using the models; in response to the similarity score matching a threshold, inputting the candidate entity-member entity pair to a classifier to produce a classification; where the classifier uses a machine learning model that has been trained using features derived from previously-analyzed candidate entity-member entity pairs; where the classification indicates a mathematical likelihood that a match has been found between the candidate entity data and the member entity data.

20 Claims, 5 Drawing Sheets

100

8 Blocking Process

10 A natural language processor outputs statistical models of candidate entity data and member entity data, respectively, of a candidate entity-member entity pair 12 A similarity function outputs a similarity score for the candidate entity-member entity pair in response to input of the statistical models 14 The candidate entity-member entity pair is input to a machine learning-based model to produce a classification 16 An online service acts on the classification

(51) Int. Cl.
  *G06N 20/00* (2019.01)
  *H04L 12/58* (2006.01)
  *G06K 9/62* (2006.01)
  *G06F 16/31* (2019.01)
(58) Field of Classification Search
  USPC .................................................. 707/600–899
  See application file for complete search history.

HYBRID ENTITY MATCHING TO DRIVE PROGRAM EXECUTION

TECHNICAL FIELD

One technical field of the present disclosure is online systems. Another technical field of this disclosure is cross-application resolution of data entities.

BACKGROUND

Computers are used to perform the task of finding records that refer to the same entity across different data sources, where the records may or may not share a common identifier.

Fuzzy matching allows for inexact entity resolution by computing a probability that two records refer to the same entity. Traditional fuzzy matching methods require careful selection of threshold values for match determination. The use of threshold values requires a trade-off between precision and recall. Setting a threshold value to achieve high precision sacrifices recall and vice versa. Additionally, existing fuzzy matching approaches are computationally demanding, particularly for large data sets. A technique known as blocking has been used to improve efficiency.

Blocking attempts to limit the number of comparisons that need to be made to only those records that have some identifying information in common. However, the blocking criteria is determined by trial and error and thus requires multiple iterations. As a result, blocking may not improve computation speed for large data sets unless the blocking strategy is carefully designed.

Some machine learning techniques have been explored but have suffered from accuracy and scalability problems when applied to entity resolution tasks.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
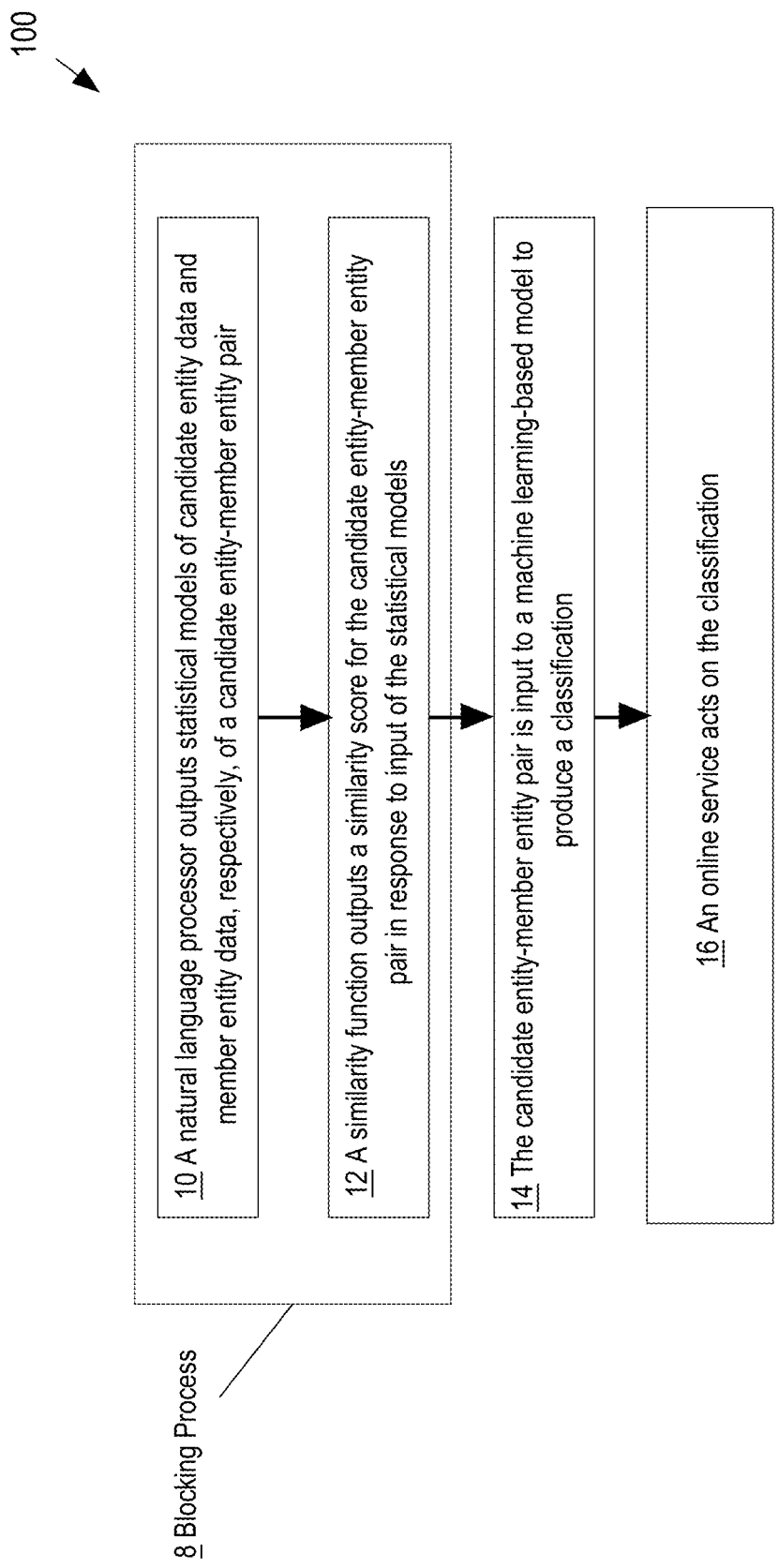
FIG. 1 is a flow diagram of a process, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

End users may be identified differently in different software applications. For example, end users may use different email addresses in different applications, depending, for example, on whether the applications are used for professional or personal reasons.

Some member-based application services, including online professional or social connection networks, allow end users to upload their personal address books or contacts lists. After an end user uploads his or her contacts to an online service, the online service may attempt to determine whether the uploaded contacts are or are not already members of the online service.

The need to match contact information across applications also arises when inter-application data sharing capabilities are implemented. For example, it may be desirable to enable profile data maintained by a connection network application to be made available within an email application, or to use email address data maintained by the email application to trigger certain functionality within the connection network application.

An application may take different actions depending on whether a contact record is matched with an existing member record. When the application makes program execution decisions based on whether a contact matches an existing member record, an error in the matching process can cause the application to make incorrect or inappropriate program execution decisions, which in turn can cause data hygiene issues that may result in end user confusion or even frustration.

The disclosed technologies address these and other issues and can enable efficient and scalable cross-application data sharing capabilities. The disclosed technologies have been shown to efficiently perform entity resolution on large data sets, including data sets having a billion or more contact records.

The disclosed technologies include a hybrid technique that is more computationally efficient and, thus, more scalable than known approaches. The disclosed technologies use a combination of natural language processing and blocking techniques to reduce a set of entity pairs to a subset of those pairs that are likely to be good match candidates more intelligently and more efficiently than is possible with previously known blocking techniques. The disclosed technologies then use a set of similarity functions to derive a set of features from the entity pairs. The features computed using the set of similarity functions are used to train a machine learning model. The machine learning model is a statistical model that is built using supervised machine learning techniques. The machine learning model is used to classify entity pairs as matching or not matching.

The machine learning model can be used in conjunction with or independently of the similarity function. For example, the machine learning model can be applied to entity pairs regardless of their pre-computed similarity scores, or the machine learning model can be used to refine the similarity score calculated in the previous stage. In some embodiments, the machine learning model itself is used as a sophisticated similarity function in that if the output of the machine learning model is a probability score for a match, the machine learning model output can also be used as a normalized similarity score to measure the distance between two records.

Using the disclosed approach reduces the number of entity pairs that are analyzed by the machine learning classifier and thereby improves computational efficiency.

Additionally, portions of the disclosed approach can be implemented using map and reduce jobs, which further increases the computational efficiency of the disclosed approach over prior fuzzy matching techniques and improves scalability.

The disclosed technologies are not limited to the above advantages. Other advantages may be realized by any one or more embodiments of the disclosed technologies.

Process Overview

FIG. 1 is a flow diagram that depicts a process 100 that can be performed by an entity matching service, which may be accessed and used by an application service, in an embodiment. Portions of process 100 may be performed by a single entity or program or by multiple entities or programs, including for example a browser plug-in and a remote server. The operations of the process as shown in FIG. 1 can be implemented using processor-executable instructions that are stored in computer memory.

Figure 3:
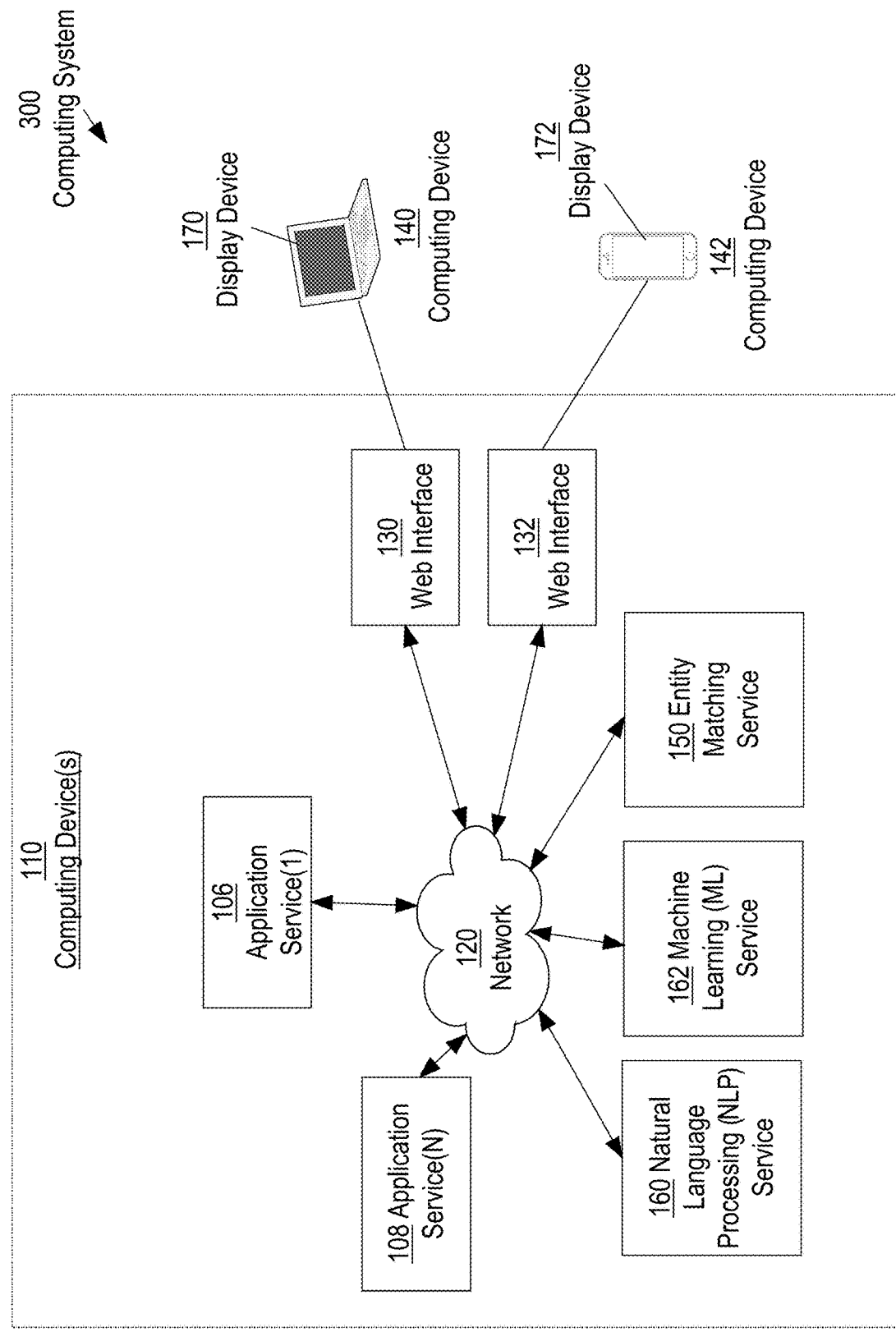
FIG. 3 is a block diagram of a networked computing environment, in an embodiment.

For purposes of providing a clear example, the operations of FIG. 1 are described as performed by computing device(s) 110, 140 of FIG. 3, which may be individually or collectively referred to as simply 'computing system 300.' In an embodiment, portions of process 100 may be implemented in entity matching service 150, natural language processing service 160 and machine learning service 162 of FIG. 3. Portions of process 100 may be performed in response to an entity matching request received by entity matching service 150 from an application service 106, 108.

A blocking process 8 incorporates natural language processing techniques to produce candidate entity pairs to be classified using a machine learning model. Blocking process 8 includes operations 10 and 12. In operation 10, a natural language processor of computing system 300 outputs a first type of statistical models of candidate entity data and member entity data, respectively, of a candidate entity-member entity pair. The natural language processor receives a set of digital inputs that includes a candidate entity-member entity pair. The candidate entity-member entity pair includes candidate entity data and member entity data.

In the context of operation 10, the term statistical model is used to refer to a weighted string of data that represents a contact record. In an embodiment, operation 10 uses a term frequency-inverse document frequency (TF-IDF) algorithm to assign weights to words in the string. As used herein, terms such as word and token refer to text, and may correspond to a word, a portion of a word, or other text string. Operation 10 generates a weighted string for each of the candidate entity and the member entity in the candidate entity-member entity pair.

In an embodiment, member entity data has been extracted from a node of an online service and candidate entity data has been extracted from a data record of another application. An example of candidate entity data is a contact record extracted from an electronic address book, an email system or a contact management system. An example of member entity data is a member profile record that is extracted from a data node of an online connection network. Terminology such as entity, node and record may be used herein to refer to a database record or other logical organization of related data elements that is implemented in software using, for instance, data structures such as tables and fields or objects and properties or attributes. Extraction of entity data can be accomplished using, for example, an export function of the application that manages the entity data, which produces an electronic file that contains the exported data.

In an embodiment, operation 10 is triggered by a determination that an exact match does not exist between the candidate entity data and the member entity data. An exact match does not exist when, for example, the entity identifier associated with a candidate record does not exactly match the entity identifier associated with the member record, but portions of other information in the contact record and the member record, such as first or last name and company name, may appear to match. Examples of entity identifiers include email addresses, user names, and account identifiers.

Using the natural language processor, in response to the set of digital inputs, operation 10 outputs the first type of statistical models of the candidate entity data and the member entity data, respectively; e.g., the TF-IDF weighted strings that represent the candidate entity and the member entity, respectively. In an embodiment, the statistical models indicate weight values assigned by the natural language processor to words in the candidate entity data and weight values assigned by the natural language processor to words in the member entity data, respectively.

In an embodiment, blocking process 8 creates the candidate entity-member entity pair in response to finding a same word in different portions of the candidate entity data and the member entity data; that is, based on finding shared tokens across the weighted text strings. For example, blocking process 8 may determine that the email domain "linkedin" in the candidate entity data is also found in the company field of the member entity data.

In operation 12, a pairwise similarity function outputs a similarity score for the candidate entity-member entity pair analyzed in operation 10, by performing a mathematical comparison of the first type of statistical models of the candidate entity data and member entity data that are produced by operation 10. In an embodiment, the similarity function produces the similarity score by mathematically comparing text found in the candidate entity data to text found in the member entity data.

In an embodiment, operation 12 calculates a cosine similarity for the entity pair. Examples of text include words, tokens and other strings found in the candidate entity data or the member entity data, which may be mathematically compared by operation 12, include any one or more of the following: a first name, a last name, an email username, a word extracted from an email username, an email domain, a company name inferred from an email domain, a zip code, a location.

In operation 14, process 100 inputs the candidate entity-member entity pair to a machine learning model to produce a classification. In an embodiment, operation 14 is performed when the similarity score matches or is above a threshold. In other embodiments, operation 14 is performed on all entity pairs, independently of operation 12.

In an embodiment, the machine learning model is a probabilistic model or a statistical model that has been trained using a supervised machine learning technique. In an embodiment, the machine learning model has been trained using similarity features that have been derived from previously-analyzed candidate entity-member entity pairs. Examples of similarity features used to train the machine learning model include rich features, which represent a given entity pair, and which are derived from the entity pair using a set of similarity functions.

Examples of similarity functions that may be used to produce the derived similarity features used to train the machine learning model include any one or more of the following: a Jaro-Winkler function, a MongeElkan function, a Levenshtein function, a PrefixSimilarity function, a JaccardSimilarity function, a ContainmentSimilarity function, a Longest Common Sequence function, a Longest Common Substring function.

Different similarity functions may be applied to different attributes or portions of the entity pair. For example, different feature similarity functions can be applied on different attributes, e.g. Person Name, Phone Number, etc. to capture different types of similarity signals. e.g., a Jaro-Winkler similarity function may be applied to Person Name to get one similarity feature, while a Levenshtein similarity function may be applied on Street Address to get another similarity feature.

In an embodiment, the classification produced by the machine learning model indicates a likelihood that a match has or has not been found between the candidate entity data and the member entity data. In an embodiment, the machine learning model determines the classification for the candidate entity-member entity pair in response to receiving a set of inputs that include any one or more of the following, which have been extracted or derived from the candidate entity-member entity pair: a name, an email domain, a username, a similarity score, connection data that is associated with a source of the candidate entity data and the online service. Examples of types of machine learning models that may be used in operation 14 include but are not limited to any one or more of the following: logistic regression, decision tree, random forest, support vector machine, gradient boosting.

In operation 16, an online service acts on the classification that is produced by operation 14. In an embodiment, in response to the classification indicating that the candidate entity data matches the member entity data, an online service is caused to transmit a first electronic message to an address of a source of the candidate entity data and not transmit a second electronic message to an address in the candidate entity data.

In an embodiment, the candidate entity data is received by blocking process 8 in response to an operation of the online service. An example of a first message caused to be transmitted in response to the classification is a recommendation that is displayed to a member. When an entity matching service determines, using process 100, that a contact record matches a member record on the connection network, the classification produced by the entity matching service can trigger a display of the member record that has been found to match the contact record. When a member record has been found that matches the contact record, the online service may additionally be caused to not transmit a message to an email address in the contact record.

Similarly, in response to the classification indicating that the candidate entity data does not match the member entity data, an online service is caused to transmit a second electronic message to an address in the candidate entity data and not transmit a first electronic message to an address of a source of the candidate entity data. In this case, the online service is caused to transmit the guest invitation to the contact and not transmit a people you may know message to the member. Other actions may be taken by the online service in response to the classification produced by operation 14 and the above are provided only as examples. Actions taken by the online service in response to the classification produced by operation 14 will vary based on the requirements of the particular online service and the manner in which the online service uses the classification.

Example Arrangement of Software Components for Entity Matching

Figure 2:
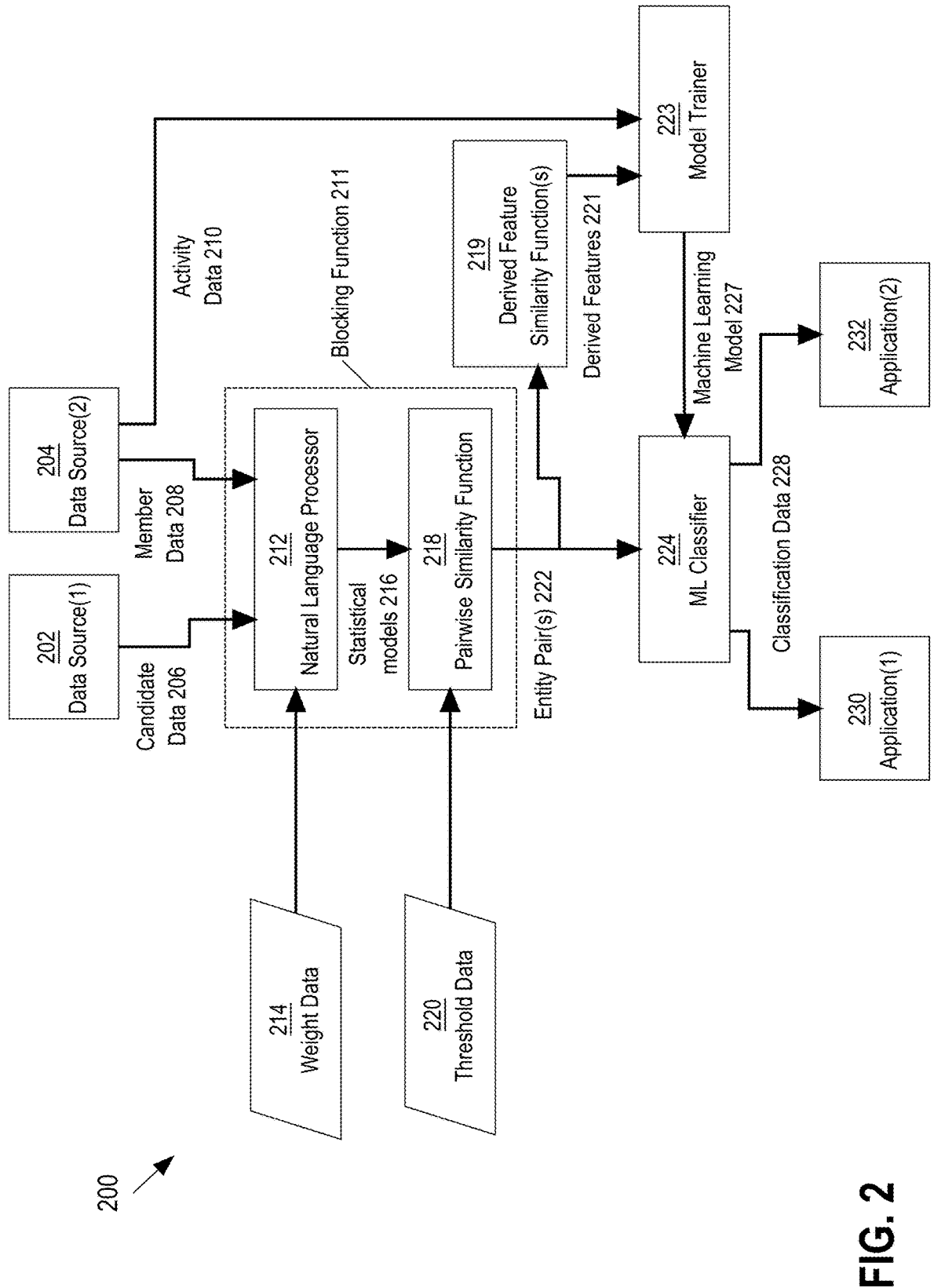
FIG. 2 is a block diagram of a software-based system, in an embodiment.

FIG. 2 is a block diagram that depicts an example system 200 for performing inexact or probabilistic entity matching using the disclosed technologies, in an embodiment. The software-based components of the system of FIG. 2 include data source(1) 202, data source(2) 204, blocking function 211, which includes natural language processor 212 and pairwise similarity function 218, machine learning classifier 224, application(1) 230, application(2) 232. Natural language processor 212, similarity function 218, derived feature similarity function(s) 219, model trainer 223, machine learning (ML) classifier 224, application(1) 230, application (2) 232, and are each implemented using machine-readable instructions.

Data source(1) 202 supplies candidate data 206 for use by natural language processor 212. An example of data source (1) 202 is an email address book or contacts list. An example of candidate data 206 is a contact record extracted from an email address book or contacts list. In an embodiment, candidate data 206 includes any one or more of the following fields: upload member, which identifies the member who uploaded the contact record to an online service; contact first name/last name, from the contact record uploaded by the member; email address, a string containing an email address, from the contact record uploaded by the member.

Data source(2) 204 supplies member data 208 for use by natural language processor 212 and supplies activity data 210 for use by model trainer 223. An example of data source(1) 202 is a member node of an online connection network. An example of member data 208 is profile data extracted from the member node. In an embodiment, member data 208 includes any one or more of the following fields: member identifier; first name/last name; job title; company name(s).

Blocking function 211 includes natural language processor 212 and pairwise similarity function 218. In or prior to natural language processor 212, candidate data 206 and/or member data 208 may undergo preprocessing that includes any one or more of the following: tokenization, segmentation, stemming, lemmatization, standardization, translation, filtering of invalid records, such as non-personal email addresses and distribution lists, and normalization of data elements into joinable formats. An example of a joinable format is all string fields in lowercase with extra spaces removed. In an embodiment, also known as names, such as nicknames and alternative spellings (e.g., Jim for James or Bob for Robert), are added during data normalization.

After preprocessing, both candidate data 206 and member data 208 are in the form of text strings made up of concatenated filtered, normalized data, where each such text string is considered to be a document and is assigned a document identifier. In an embodiment, for candidate data 206, the document identifier is the contact identifier extracted from the contact record, and for member data 208, the document identifier is the member identifier extracted from the member record.

Natural language processor 212 analyzes the contents of and produces statistical models 216 for each of the candidate data 206 and member data 208, using weight data 214. In one embodiment, natural language processor 212 performs a multi-step process to analyze words (e.g., tokens or terms) contained within the candidate data 206 and member data 208.

To do this, natural language processor 212 tokenizes and counts the frequency of each word/token in each document (string of candidate data 206 or member data 208, as the case may be). Terminology such as word, token, or term may be used herein to refer to a contiguous set of characters. For instance, a token may include a full word, such as first name, or a portion of a term, such as the domain name portion or the user name portion of an email address. An illustration of tokenizing of documents is shown in Table 1 below.

TABLE 1

Example of tokenized document.

| Doc ID | Name | Company |
|--------|------|---------|
| 1 | A | X |
| 2 | B | Y |

In Table 1, name and company tokens are extracted from each document 1,2. The name is A in document 1 and B in document 2. The company is X in document 1 and Y in document 2. Natural language processor 212 counts the frequency of occurrence of each word/term/token in each document and uses the word frequency information to build an inverted index. In the inverted index, key is a word, value is a list of tuples containing (doc_id, frequency) inside the document identified by Doc ID. An illustration of an inverted index is shown in Table 2 below.

TABLE 2

Example of inverted index.

| Key | Value (Doc ID, Frequency) |
|-----|---------------------------|
| A | (1, 1), (99, 1), . . . |
| B | (2, 1), (123, 1), . . . |

In Table 2, one occurrence of word A is found in document 1 and document 99, and one occurrence of word B is found in document 2 and document 123. Based on the portion of the inverted index provided, word A is not found in document 2 or document 123 and word B is not found in document 1 or document 99.

Natural language processor 212 calculates the TF-IDF weight 214 based on the word frequency information. For a term t in a document d, the weight Wt,d of term t in document d is computed using: $W(t, d) = TF(t) \log(N/DF(t))$, where TF(t) is the number of occurrences of t in document d; DF(t) is the number of documents containing the term t; and N is the total number of documents. Thus, a higher value of weight Wt,d indicates that a term is more unique to a particular document (occurs more frequently in a particular document than in other documents) and a lower value of weight Wt,d indicates that the term occurs frequently across all documents. In this way, the TD-IDF weight values are used to identify important or salient portions of candidate data 206 and member data 208, respectively. Those important or salient portions, which are identified computationally, likely may be useful in determining whether the two entities in fact refer to the same person.

An illustration of TF-IDF weight values computed for individual terms of the documents (strings of candidate data 206, member data 208) is shown in Table 3 below.

TABLE 3

Example of inverted index.

| Doc ID | Value (Term, TF-IDF Weight) |
|--------|------------------------------|
| 1 | (A, $W_{1, A}$), (B, $W_{1, B}$), . . . |
| 2 | (X, $W_{1, X}$), (Y, $W_{1, Y}$), . . . |

In Table 3, $W_{1,A}$ is the TF-IDF weight for word A in document 1; $W_{1,B}$ is the TF-IDF weight for word B in document 1, $W_{1,X}$ is the TF-IDF weight for word X in document 2, and $W_{1,Y}$ is the TF-IDF weight for word Y in document 2. Natural language processor 212 scales the TF-IDF weights in each document so that similarity function 218 can produce a normalized similarity score that is bounded within [0, 1]. Natural language processor 212 outputs statistical models 216, which in an embodiment are the TF-IDF models of candidate data 206 and member data 208, respectively. An example of a statistical model 216 includes the word frequency and TF-IDF weights for the words in the document that has been modeled.

Pairwise similarity function 218 uses statistical models 216 to pair or group documents (strings of candidate data 206 and member data 208, for example) that share the same words and calculates a similarity score for each pair or group based on the normalized TF-IDF weights. In an embodiment, a cosine similarity is calculated and the similarity score between document i and document j is given by: similarity(i, j)=$\Sigma_{term} w'_{i,term} \times w'_{j,term}$, where $w'_{i,term}$ is the normalized TF-IDF weight for term term in document i and $w'_{j,term}$ is the normalized TF-IDF weight for term term in document j.

Pairs with a similarity score above a pre-specified criterion, threshold data 220 are populated as candidate pairs for further evaluation by ML classifier 224. Threshold data 220 determines the trade-off between accuracy and efficiency. Thus, threshold data 220 is chosen considering the constraints on both the number of matched results and computation time, which may vary depending on the requirements of the application that is using the similarity score.

An illustration of similarity scores computed for documents in a candidate pair is shown in Table 4 below.

TABLE 4

Example of similarity score.

| Document Pair | Similarity Score |
|---------------|------------------|
| 1, 2 | sum($w'_{1, term}$ * $w'_{2, term}$) |

As shown in Table 2, the similarity score for a document pair that includes document 1 and document 2 is produced using the equation specified above. Pairwise similarity function 218 uses the similarity scores to create entity pair(s) 222, which are input to the ML classifier 224.

Machine learning classifier 224 uses machine learning techniques to compare entity pair(s) 222 that are produced by blocking function 211. Machine learning classifier 224 uses machine learning model 227 to evaluate candidate-member pair(s) 222 and produce classification data 228. Classification data 228 indicates the probability that candidate-member pair 222 is matched; that is, that the candidate data 206 and the member data 208 in the candidate-member pair 222 refer to the same entity. As used herein, person or entity may refer to an end user of computer systems, which typically is a human person but could be another type of entity, such as a corporate entity or device, in other embodiments.

Machine learning model 227 is trained by applying a machine learning algorithm to features extracted from prior examples of candidate-member pairs 222. In an embodiment, features used to train machine learning model 227 include derived features 221, which are computed by applying one or more derived feature similarity functions 219 to previously evaluated candidate-member pairs 222, and related activity data 210. For example, candidate-member pairs 222 that have been found to be an exact match can be used as part of the training data.

Activity data 210 is obtained from data source 204, for example, a log file of activity data extracted from an online connection network. The features used to train machine learning model 227 can include both raw features and derived or computed features. Examples of raw features are first name and email domain. Examples of derived or computed features are company name derived from email domain, size of connection network, upload count.

Other examples of derived or computed features are derived features 221, which are output by derived feature similarity function(s) 219. Derived feature similarity function(s) 219 include any one or more of the feature similarity functions, for example: a Jaro-Winkler function, a MongeElkan function, a Levenshtein function, a PrefixSimilarity function, a JaccardSimilarity function, a ContainmentSimilarity function, a LongestCommonSequence function, a Longest CommonSubstring function.

In an embodiment, training data used to train machine learning model 227 includes any one or more of the following: for candidate data 206, contact email-based features such as length of email address (as measured by word count, for example); contact origin (company name, for example), connection prediction (such as whether the contact uploader/importer has a first-degree connection with the contact in an online connection network); uploader's address book size; size of uploader/importer's second-degree connection network ("friends of friend"); upload count (number of unique uploaders who have the same email address in their contacts list); number of guest invitations received; number of guest invitation clicks; first name; also known as (a/k/a name), last name; email address; email username; meaningful words extracted from email username; email domain; company inferred from email domain.

Examples of machine learning algorithms that may be used to train machine learning model 227 include but are not limited to any one or more of the following: logistic regression, decision tree, random forest, gradient boosting machine (GBM), support vector machine (SVM).

Figure 4A:
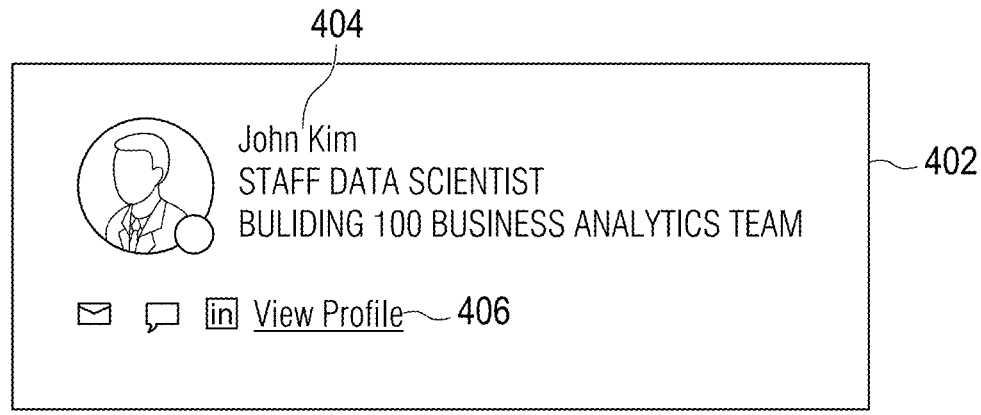
FIG. 4A and FIG. 4B are example screen captures, in an embodiment.
Figure 4B:
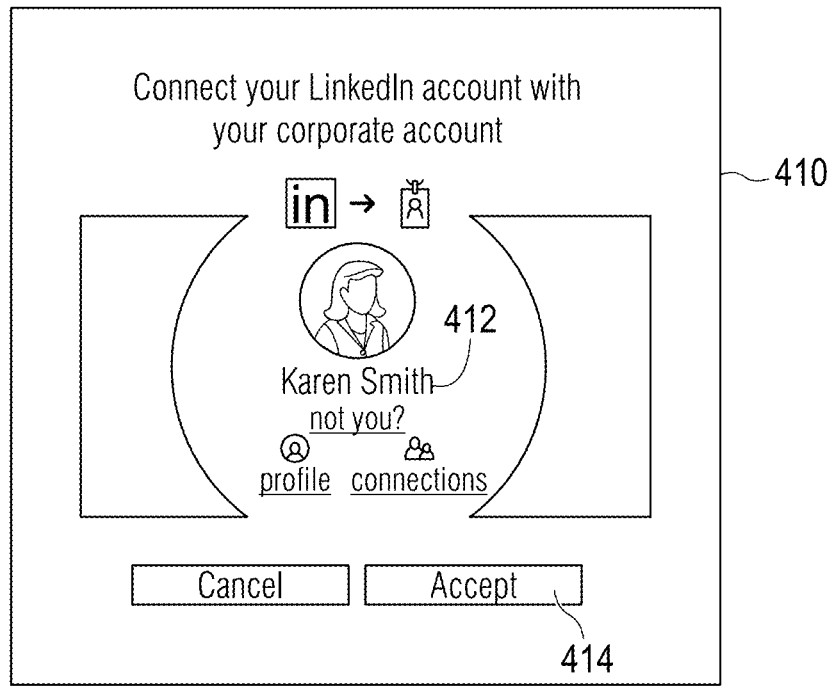

Classification data 228 is output for use by one or more software applications, such as application(1) 230 and application(2) 232. In an embodiment, classification data 228 is used by an online connection network to drive program execution decisions such as whether to send a notification or recommendation to an end user. Alternatively or in addition, classification data 228 may be used by an email service to drive program execution decisions such as whether to expose profile data of a member of an online connection network to a user of the email service. Example use cases are shown in FIGS. 4A and 4B, described below.

Example Networked System Environment

FIG. 3 is a block diagram that depicts an example computing system 300 arranged to operate application service(1) 106, application service(N) 108, entity matching service 150, natural language processing (NLP) service 160, machine learning (ML) service 162, web interfaces 130, 132, in an embodiment. Computing system 300 includes computing device(s) 110, computing devices 140, 142, and display devices 170, 172, which are communicatively coupled to an electronic communications network 120.

Implemented in the devices 110, 140, 142, 170, 172 using computer software, hardware, or software and hardware, are processor-executable instructions, data structures, and digital data, stored in memory, which cooperate to provide the computer-implemented functionality described herein. For ease of discussion, these computer-implemented components are represented schematically in FIG. 3 as application service(1) 106, application service(N) 108, web interface 130, web interface 132, entity matching service 150, natural language processing (NLP) service 160, machine learning (ML) service 162.

"System" as used herein may refer to a single computer or network of computers and/or other devices. "Computing device" as used herein may refer to a computer or any other electronic device that is equipped with a processor. Although computing system 300 may be implemented with any number of application service(1) 106, application service(N) 108, web interface 130, web interface 132, entity matching service 150, natural language processing (NLP) service 160, machine learning (ML) service 162, computing device(s) 110, display devices 170, 172 and computing devices 140, 142, respectively, in this disclosure, these elements may be referred to in the singular form for ease of discussion.

Application service(1) 106, application service(N) 108, web interface 130, web interface 132, entity matching service 150, natural language processing (NLP) service 160, machine learning (ML) service 162 are shown as separate elements in FIG. 3 for ease of discussion but the illustration is not meant to imply that separation of these elements is required. The illustrated systems (or their functionality) and data stores may be divided over any number of physical systems, including a single physical computer system, and can communicate with each other in any appropriate manner.

Web interfaces 130, 132 may be implemented using a Web server computer that communicates with Web browser software running on computing devices 140, 142. Web interfaces 130, 132 enable access to different portions of the functionality of computing system 300, by computing devices 140, 142. For example, web pages containing profile data of Application service(1) 106 may be presented to entities via web interfaces 130, 132 using web browser software.

Portions of the illustrative application service(1) 106, application service(N) 108, web interface 130, web interface 132, entity matching service 150, natural language processing (NLP) service 160, machine learning (ML) service 162 may be implemented as web-based software applications and hosted by a hosting service (not shown). For example, web interfaces 130, 132, and portions of application service (1) 106, application service(N) 108, entity matching service 150, natural language processing (NLP) service 160, machine learning (ML) service 162 may be implemented as client-side and server-side portions, respectively, of a connection network service such as the LINKEDIN software, which is commercially available from LinkedIn Corporation of Sunnyvale, Calif. and/or an email service such as MICROSOFT OUTLOOK. In an embodiment, portions of each of web interface 130 and web interface 132 are implemented in a web browser that can execute on computing devices 140, 142, respectively.

In some embodiments, each of computing devices 140, 142 is a client-side computing device or set of cooperating computing devices, such as a smart phone, tablet computer, wearable or body-mounted device, smart appliance, laptop machine, or combination of any of such devices, and computing device 110 is a server-side computing device such as a server computer or network of server computers accessible by the Internet, for example in a public or private cloud. As illustrated in FIG. 3, each of display devices 170, 172 is implemented in a computing device 140, 142, respectively, but may be implemented as a separate device or as part of another device, or as multiple networked display devices, in other implementations.

Application service(1) 106 is a computer-implemented networking service for entities, such as a professional networking service or an online social network. Application service(1) 106 contains nodes that represent the entities using application service 106. Data associated with nodes and connections between nodes are represented using a connection graph. In the context of application service 106, "node" may refer to a software abstraction of entity data and need not be tied to any particular hardware or machine that is connected to network 120.

Some implementations of Application service(1) 106 allow entities (via users operating electronic devices) to register with Application service(1) 106 (thereby creating a node on application service 106), create entity data (for example, profile data), establish connections with other registered entities, and perform other actions, such as message other entities, post articles, view postings from other entities, comment on postings, "like" postings, endorse other entities or established connections, etc. An entity profile may include, for example, a name of the entity, a job title, a job industry, academic institutions attended, employment status, previous and current employers, skills, endorsements from other entities, contact information, address information.

Application service(N) 108 is another type of software application, where N is a positive integer and used to signify that any number of application services 108 may be connected to network 120 and use the disclosed technologies. In an embodiment, application service(N) 108 is an email application, a contact management application, or another type of software application that allows users to maintain information for contacts. For example, application service (N) 108 may permit users to store email address, name, and phone number information for their contacts in a searchable electronic address book.

Entity matching service 150 is a network-based service that provides entity match determinations using the technologies disclosed herein. In an embodiment, at least similarity function 218 of FIG. 2 and/or portions of operations 12, 14 of FIG. 1 are implemented in entity matching service 150. In an embodiment, application services 106, 108 communicate entity data to entity matching service 150 and receive match decisions from entity matching service 150 via an application program interface (API).

Natural language processing (NLP) service 160 is a network-based service that produces, for example, statistical models 216 of FIG. 2 and/or performs portions of operation 10 of FIG. 1. In an embodiment, entity matching service 150 communicates bidirectionally with NLP service 160 via an application program interface (API).

Machine learning (ML) service 162 is a network-based service that produces, for example, classification data 228 of FIG. 2 and/or performs portions of operation 14 of FIG. 1. In an embodiment, entity matching service 150 communicates bidirectionally with NLP service 160 via an application program interface (API).

Network 120 may be implemented on any medium or mechanism that provides for the exchange of data between the devices that are connected to the network. Examples of network 120 include, without limitation, a network such as a Local Area Network (LAN), Wide Area Network (WAN), Ethernet or the Internet, or one or more terrestrial, satellite or wireless links. Network 120 may include a combination of networks, such as a combination of wired and wireless networks, as needed to enable communications between the computing device(s) 110, 140, 142.

Computing devices 140, 142 operate web interfaces 130, 132 to establish logical connection(s) over network 120 with portions of Application service(1) 106 and may establish logical connection(s) over network 120 with network perimeter security service 102, entity matching service 150, and/or machine learning (ML) service 162.

Use Example

Cross-Application Entity Matching

FIG. 4A and FIG. 4B are example screen captures, in an embodiment.

FIG. 4A illustrates an example of a user interface 402 that may be presented to a user of an email program. The disclosed entity matching technologies are used to match entity data 404 stored in the email program with a member of an online connection network. The matching process performed by the disclosed technologies may be performed during an offline cross-application data integration process, for example.

In response to the entity match determination made by the disclosed technologies, the email program has made a program execution decision to display an interactive element 406 that enables direct access to profile information of the matched entity within the online connection network. This is so, even though the entity 404 may have a very common first or last name and even if the email address associated with entity 404 in the email program does not match the email address associated with the profile in the online connection network.

FIG. 4B illustrates an example of a user interface 410 that may be presented to a user of an online connection network. The disclosed entity matching technologies are used to match entity data 412 stored in a profile of the online connection network with an email address stored in an address book of an email program. The matching process performed by the disclosed technologies may be performed during or triggered by an address book import or contacts upload operation of the online connection network, for example.

In response to the entity match determination made by the disclosed technologies, the online connection network has made a program execution decision to display an interactive element 414 that enables the user of the online connection network to establish a link between the profile information of the online connection network and the email account within the email program. This is so, even though the entity 412 may have a very common first or last name and even if the email address associated with entity 412 in the email program does not match the email address associated with the profile in the online connection network.

Implementation Example

Hardware Overview

According to one embodiment, the techniques described herein are implemented by one or more computing devices. For example, portions of the disclosed technologies may be at least temporarily implemented on a network including a combination of one or more server computers and/or other computing devices. The computing devices may be hardwired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such computing devices may also combine custom hard-wired logic, ASICs, or FPGAs with custom programming to accomplish the described techniques.

The computing devices may be server computers, personal computers, or a network of server computers and/or personal computers. Illustrative examples of computers are desktop computer systems, portable computer systems, handheld devices, mobile computing devices, wearable devices, body mounted or implantable devices, smart phones, smart appliances, networking devices, autonomous or semi-autonomous devices such as robots or unmanned ground or aerial vehicles, or any other electronic device that incorporates hard-wired and/or program logic to implement the described techniques.

Figure 5:
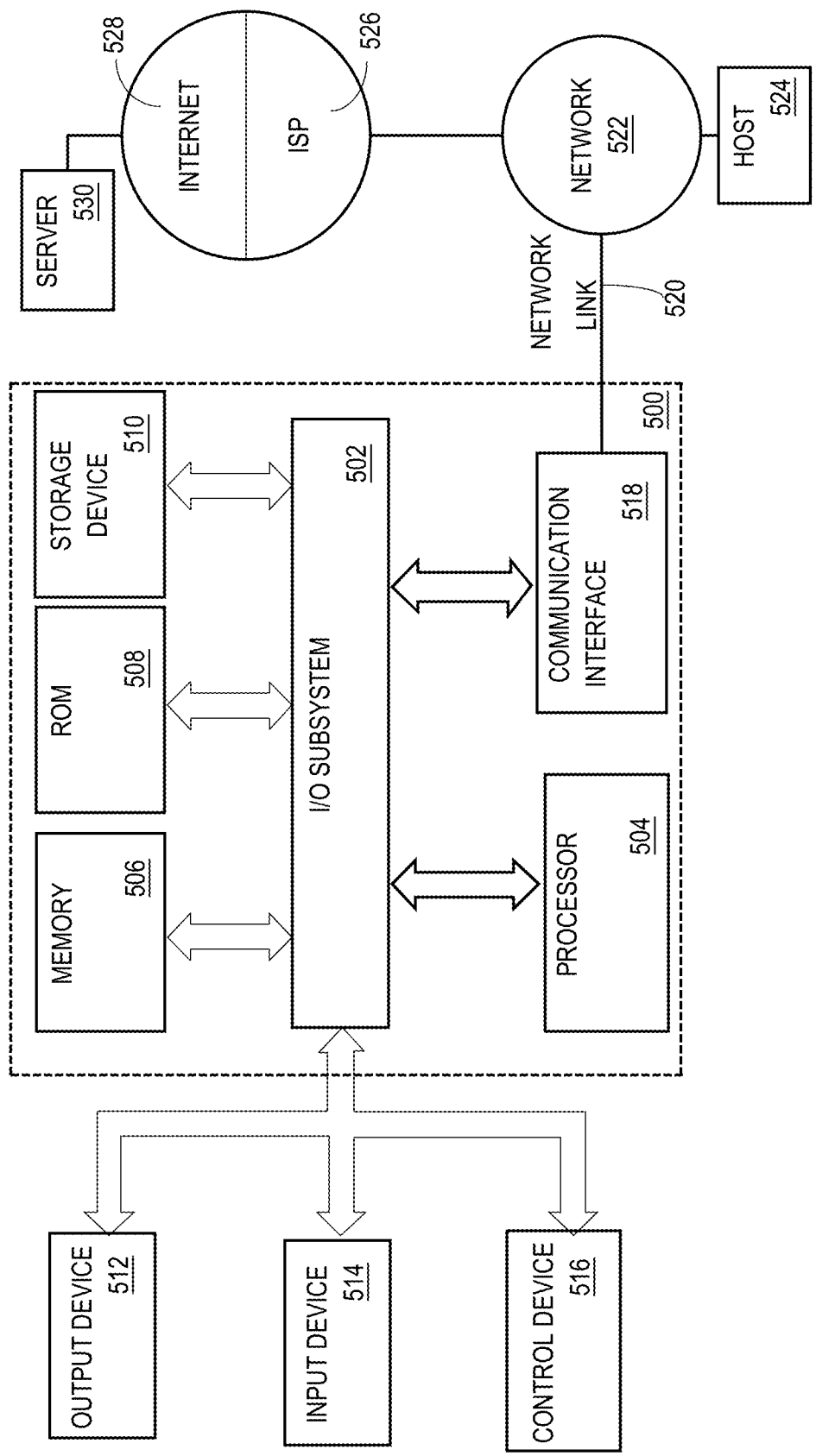
FIG. 5 is a block diagram that illustrates a hardware environment upon which an embodiment of the invention may be implemented.

For example, FIG. 5 is a block diagram that illustrates a computer system 500 upon which an embodiment of the present invention may be implemented. Components of the computer system 500, including instructions for implementing the disclosed technologies in hardware, software, or a combination of hardware and software, are represented schematically in the drawings, for example as boxes and circles.

Computer system 500 includes an input/output (I/O) subsystem 502 which may include a bus and/or other communication mechanism(s) for communicating information and/or instructions between the components of the computer system 500 over electronic signal paths. The I/O subsystem may include an I/O controller, a memory controller and one or more I/O ports. The electronic signal paths are represented schematically in the drawings, for example as lines, unidirectional arrows, or bidirectional arrows.

One or more hardware processors 504 are coupled with I/O subsystem 502 for processing information and instructions. Hardware processor 504 may include, for example, a general-purpose microprocessor or microcontroller and/or a special-purpose microprocessor such as an embedded system or a graphics processing unit (GPU) or a digital signal processor.

Computer system 500 also includes a memory 506 such as a main memory, which is coupled to I/O subsystem 502 for storing information and instructions to be executed by processor 504. Memory 506 may include volatile memory such as various forms of random-access memory (RAM) or other dynamic storage device. Memory 506 also may be used for storing temporary variables or other intermediate information during execution of instructions to be executed by processor 504. Such instructions, when stored in non-transitory computer-readable storage media accessible to processor 504, render computer system 500 into a special-purpose machine that is customized to perform the operations specified in the instructions.

Computer system 500 further includes a non-volatile memory such as read only memory (ROM) 508 or other static storage device coupled to I/O subsystem 502 for storing static information and instructions for processor 504. The ROM 508 may include various forms of programmable ROM (PROM) such as erasable PROM (EPROM) or electrically erasable PROM (EEPROM). A persistent storage device 510 may include various forms of non-volatile RAM (NVRAM), such as flash memory, or solid-state storage, magnetic disk or optical disk, and may be coupled to I/O subsystem 502 for storing information and instructions.

Computer system 500 may be coupled via I/O subsystem 502 to one or more output devices 512 such as a display device. Display 512 may be embodied as, for example, a touch screen display or a light-emitting diode (LED) display or a liquid crystal display (LCD) for displaying information, such as to a computer user. Computer system 500 may include other type(s) of output devices, such as speakers, LED indicators and haptic devices, alternatively or in addition to a display device.

One or more input devices 514 is coupled to I/O subsystem 502 for communicating signals, information and command selections to processor 504. Types of input devices 514 include touch screens, microphones, still and video digital cameras, alphanumeric and other keys, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 516, which may perform cursor control or other automated control functions such as navigation in a graphical interface on a display screen, alternatively or in addition to input functions. Control device 516 may be implemented as a touchpad, a mouse, a trackball, or cursor direction keys for communicating direction information and command selections to processor 504 and for controlling cursor movement on display 512. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 514 may include a combination of multiple different input devices, such as a video camera and a depth sensor.

Computer system 500 may implement the techniques described herein using customized hard-wired logic, one or more ASICs or FPGAs, firmware and/or program logic which in combination with the computer system causes or programs computer system 500 to operate as a special-purpose machine. According to one embodiment, the techniques herein are performed by computer system 500 in response to processor 504 executing one or more sequences of one or more instructions contained in memory 506. Such instructions may be read into memory 506 from another storage medium, such as storage device 510. Execution of the sequences of instructions contained in memory 506 causes processor 504 to perform the process steps described herein. In alternative embodiments, hard-wired circuitry may be used in place of or in combination with software instructions.

The term "storage media" as used in this disclosure refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as memory 506. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 500 can receive the data on the communication link and convert the data to a format that can be read by computer system 500. For instance, a receiver such as a radio frequency antenna or an infrared detector can receive the data carried in a wireless or optical signal and appropriate circuitry can provide the data to I/O subsystem 502 such as place the data on a bus. I/O subsystem 502 carries the data to memory 506, from which processor 504 retrieves and executes the instructions. The instructions received by memory 506 may optionally be stored on storage device 510 either before or after execution by processor 504.

Computer system 500 also includes a communication interface 518 coupled to bus 502. Communication interface 518 provides a two-way data communication coupling to network link(s) 520 that are directly or indirectly connected to one or more communication networks, such as a local network 522 or a public or private cloud on the Internet. For example, communication interface 518 may be an integrated-services digital network (ISDN) card, cable modem, satellite modem, or a modem to provide a data communication connection to a corresponding type of communications line, for example a coaxial cable or a fiber-optic line or a telephone line. As another example, communication interface 518 may include a local area network (LAN) card to provide a data communication connection to a compatible LAN. Wireless links may also be implemented. In any such implementation, communication interface 518 sends and receives electrical, electromagnetic or optical signals over signal paths that carry digital data streams representing various types of information.

Network link 520 typically provides electrical, electromagnetic, or optical data communication directly or through one or more networks to other data devices, using, for example, cellular, Wi-Fi, or BLUETOOTH technology. For example, network link 520 may provide a connection through a local network 522 to a host computer 524 or to other computing devices, such as personal computing devices or Internet of Things (IoT) devices and/or data equipment operated by an Internet Service Provider (ISP) 526. ISP 526 provides data communication services through the world-wide packet data communication network commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data and instructions, including program code, through the network(s), network link 520 and communication interface 518. In the Internet example, a server 530 might transmit a requested code for an application program through Internet 528, ISP 526, local network 522 and communication interface 518. The received code may be executed by processor 504 as it is received, and/or stored in storage device 510, or other non-volatile storage for later execution.

Additional Examples

Illustrative examples of the technologies disclosed herein are provided below. An embodiment of the technologies may include any of the examples described below.

In an example 1, a method includes receiving a set of digital inputs; where the set of digital inputs includes a candidate entity-member entity pair that includes candidate entity data and member entity data; where the member entity data has been extracted from a node of an online service; where an exact match has not been found between the candidate entity data and the member entity data; in response to the set of digital inputs, outputting models of the candidate entity data and the member entity data, respectively; where the models indicate weight values assigned to text in the candidate entity data and weight values assigned to text in the member entity data, respectively; calculating a similarity score using the models; in response to the similarity score matching a threshold, inputting the candidate entity-member entity pair to a classifier to produce a classification; where the classifier uses a machine learning model that has been trained using features derived from previously-analyzed candidate entity-member entity pairs; where the classification indicates a mathematical likelihood that a match has been found between the candidate entity data and the member entity data; causing the online service to act on the classification; where the method is performed by one or more computing devices.

An example 2 includes the subject matter of example 1, including, in response to the classification indicating that the candidate entity data matches the member entity data, causing an online service to transmit a first electronic message to an address of a source of the candidate entity data and not transmit a second electronic message to an address in the candidate entity data.

An example 3 includes the subject matter of example 1 or example 2, including, in response to the classification indicating that the candidate entity data does not match the member entity data, causing an online service to transmit a second electronic message to an address in the candidate entity data and not transmit a first electronic message to an address of a source of the candidate entity data. An example 4 includes the subject matter of any of examples 1-3, where the candidate entity-member entity pair is created in response to finding a same word in both the candidate entity data and the member entity data. An example 5 includes the subject matter of any of examples 1-4, where the weight values are calculated using term frequency-inverse document frequency (TF-IDF) logic. An example 6 includes the subject matter of any of examples 1-5, where the similarity score is computed by mathematically comparing a word found in the candidate entity data to a word found in the member entity data, and the word found in the candidate entity data or the a word found in the member entity data includes any one or more of the following: a first name, a last name, an email username, a word extracted from an email username, an email domain, a company name inferred from an email domain. An example 7 includes the subject matter of any of examples 1-6, where the machine learning model is trained using output of any one or more of the following: a Jaro-Winkler function, a MongeElkan function, a Levenshtein function, a PrefixSimilarity function, a JaccardSimilarity function, a ContainmentSimilarity function, a LongestCommonSequence function, a LongestCommonSubstring function. An example 8 includes the subject matter of any of examples 1-7, where output of the classifier is used to determine the classification in response to inputting any one or more of the following, extracted or derived from the candidate entity-member entity pair, into the machine learning model: a name, an email domain, a username, a similarity score, or connection data that is associated with a source of the candidate entity data and the online service. An example 9 includes the subject matter of any of examples 1-8, where the machine learning model includes any one or more of the following types of machine learning models: logistic regression, decision tree, random forest, support vector machine, gradient boosting. An example 10 includes the subject matter of any of examples 1-9, where the candidate entity data is received in response to an address book import operation initiated by a user of the online service.

In an example 11, a computer program product includes one or more non-transitory computer-readable storage media including instructions which, when executed by one or more processors, cause the one or more processors to perform operations including receiving a set of digital inputs; where the set of digital inputs includes a candidate entity-member entity pair that includes candidate entity data and member entity data; where the member entity data has been extracted from a node of an online service; where an exact match has not been found between the candidate entity data and the member entity data; in response to the set of digital inputs, outputting models of the candidate entity data and the member entity data, respectively; where the models indicate weight values assigned to text in the candidate entity data and weight values assigned to text in the member entity data, respectively; calculating a similarity score using the models; in response to the similarity score matching a threshold, inputting the candidate entity-member entity pair to a classifier to produce a classification; where the classifier uses a machine learning model that has been trained using features derived from previously-analyzed candidate entity-member entity pairs; where the classification indicates a mathematical likelihood that a match has been found between the candidate entity data and the member entity data; causing the online service to act on the classification.

An example 12 includes the subject matter of example 11, where the instructions, when executed by one or more processors, cause the one or more processors to perform operations including, in response to the classification indicating that the candidate entity data matches the member entity data, causing an online service to transmit a first electronic message to an address of a source of the candidate entity data and not transmit a second electronic message to an address in the candidate entity data. An example 13 includes the subject matter of example 11, or example 12, where the instructions, when executed by one or more processors, cause the one or more processors to perform operations including, in response to the classification indicating that the candidate entity data does not match the member entity data, causing an online service to transmit a second electronic message to an address in the candidate entity data and not transmit a first electronic message to an address of a source of the candidate entity data. An example 14 includes the subject matter of any of examples 11-13, where the candidate entity-member entity pair is created in response to finding a same word in both the candidate entity data and the member entity data. An example 15 includes the subject matter of any of examples 11-14, where the weight values are calculated using term frequency-inverse document frequency (TF-IDF) logic. An example 16 includes the subject matter of any of examples 11-15, where the similarity score is computed by mathematically comparing a word found in the candidate entity data to a word found in the member entity data, and the word found in the candidate entity data or the a word found in the member entity data includes any one or more of the following: a first name, a last name, an email username, a word extracted from an email username, an email domain, a company name inferred from an email domain. An example 17 includes the subject matter of any of examples 11-16, where the machine learning model is trained using output of any one or more of the following: a Jaro-Winkler function, a MongeElkan function, a Levenshtein function, a PrefixSimilarity function, a JaccardSimilarity function, a ContainmentSimilarity function, a LongestCommonSequence function, a LongestCommonSubstring function. An example 18 includes the subject matter of any of examples 11-17, where output of the classifier is used to determine the classification in response to inputting any one or more of the following, extracted or derived from the candidate entity-member entity pair, into the machine learning model: a name, an email domain, a username, a similarity score, or connection data that is associated with a source of the candidate entity data and the online service. An example 19 includes the subject matter of any of examples 11-18, where the machine learning model includes any one or more of the following types of machine learning models: logistic regression, decision tree, random forest, support vector machine, gradient boosting. An example 20 includes the subject matter of any of examples 11-19, where the candidate entity data is received in response to an address book import operation initiated by a user of the online service.

General Considerations

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used in this disclosure the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," etc., indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to effect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
  receiving a set of digital inputs;
  wherein the set of digital inputs comprises a candidate entity-user entity pair that includes candidate entity data and user entity data;
  wherein the user entity data has been extracted from a node of an online service;
  wherein an exact match has not been found between the candidate entity data and the user entity data;
  in response to the set of digital inputs, outputting models of the candidate entity data and the user entity data, respectively;
  wherein the models indicate weight values assigned to text in the candidate entity data and weight values assigned to text in the user entity data, respectively;
  calculating a similarity score using the models;
  in response to the similarity score matching a threshold, inputting the candidate entity-user entity pair to a classifier to produce a classification;
  wherein the classifier uses a machine learning model that has been trained using features derived from previously-analyzed candidate entity-user entity pairs;
  wherein the classification indicates a likelihood that a match has been found between the candidate entity data and the user entity data;
  causing the online service to act on the classification;
  wherein the method is performed by one or more computing devices.

2. The method of claim 1, comprising, in response to the classification indicating that the candidate entity data does not match the user entity data, causing an online service to transmit a second electronic message to an address in the candidate entity data and not transmit a first electronic message to an address of a source of the candidate entity data.

3. The method of claim 1, wherein the candidate entity-user entity pair is created in response to finding a same word in both the candidate entity data and the user entity data.

4. The method of claim 1, wherein the weight values are calculated using term frequency-inverse document frequency (TF-IDF) logic.

5. The method of claim 1, wherein the similarity score is computed by comparing a word found in the candidate entity data to a word found in the user entity data, and the word found in the candidate entity data or the a word found in the user entity data comprises any one or more of the following: a first name, a last name, an email username, a word extracted from an email username, an email domain, a company name inferred from an email domain.

6. The method of claim 1, wherein the machine learning model is trained using output of any one or more of the following: a Jaro-Winkler function, a MongeElkan function, a Levenshtein function, a PrefixSimilarity function, a JaccardSimilarity function, a ContainmentSimilarity function, a LongestCommonSequence function, a LongestCommonSubstring function.

7. The method of claim 1, wherein output of the classifier is used to determine the classification in response to inputting any one or more of the following, extracted or derived from the candidate entity-user entity pair, into the machine learning model: a name, an email domain, a username, a similarity score, or connection data that is associated with a source of the candidate entity data and the online service.

8. The method of claim 1, wherein the machine learning model comprises any one or more of the following types of machine learning models: logistic regression, decision tree, random forest, support vector machine, gradient boosting.

9. The method of claim 1, wherein the candidate entity data is received in response to an address book import operation initiated by a user of the online service.

10. A method, comprising:
  receiving a set of digital inputs;
  wherein the set of digital inputs comprises a candidate entity-user entity pair that includes candidate entity data and user entity data;
  wherein the user entity data has been extracted from a node of an online service;
  wherein an exact match has not been found between the candidate entity data and the user entity data;
  in response to the set of digital inputs, outputting models of the candidate entity data and the user entity data, respectively;
  wherein the models indicate weight values assigned to text in the candidate entity data and weight values assigned to text in the user entity data, respectively;
  calculating a similarity score using the models;
  in response to the similarity score matching a threshold, inputting the candidate entity-user entity pair to a classifier to produce a classification;
  wherein the classifier uses a machine learning model that has been trained using features derived from previously-analyzed candidate entity-user entity pairs;
  wherein the classification indicates a likelihood that a match has been found between the candidate entity data and the user entity data;
  causing the online service to act on the classification, including, in response to the classification indicating that the candidate entity data matches the user entity data, causing an online service to transmit a first electronic message to an address of a source of the candidate entity data and not transmit a second electronic message to an address in the candidate entity data.

11. A computer program product comprising one or more non-transitory computer-readable storage media comprising instructions which, when executed by one or more processors, cause the one or more processors to perform operations comprising:
receiving a set of digital inputs;
wherein the set of digital inputs comprises a candidate entity-user entity pair that includes candidate entity data and user entity data;
wherein the user entity data has been extracted from a node of an online service;
wherein an exact match has not been found between the candidate entity data and the user entity data;
in response to the set of digital inputs, outputting models of the candidate entity data and the user entity data, respectively;
wherein the models indicate weight values assigned to text in the candidate entity data and weight values assigned to text in the user entity data, respectively;
calculating a similarity score using the models;
in response to the similarity score matching a threshold, inputting the candidate entity-user entity pair to a classifier to produce a classification;
wherein the classifier uses a machine learning model that has been trained using features derived from previously-analyzed candidate entity-user entity pairs;
wherein the classification indicates a likelihood that a match has been found between the candidate entity data and the user entity data;
causing the online service to act on the classification.

12. The computer program product of claim 11, wherein the instructions, when executed by the one or more processors, cause the one or more processors to perform operations comprising, in response to the classification indicating that the candidate entity data does not match the user entity data, causing an online service to transmit a second electronic message to an address in the candidate entity data and not transmit a first electronic message to an address of a source of the candidate entity data.

13. The computer program product of claim 11, wherein the candidate entity-user entity pair is created in response to finding a same word in both the candidate entity data and the user entity data.

14. The computer program product of claim 11, wherein the weight values are calculated using term frequency-inverse document frequency (TF-IDF) logic.

15. The computer program product of claim 11, wherein the similarity score is computed by comparing a word found in the candidate entity data to a word found in the user entity data, and the word found in the candidate entity data or the word found in the user entity data comprises any one or more of the following: a first name, a last name, an email username, a word extracted from an email username, an email domain, a company name inferred from an email domain.

16. The computer program product of claim 11, wherein the machine learning model is trained using output of any one or more of the following: a Jaro-Winkler function, a MongeElkan function, a Levenshtein function, a PrefixSimilarity function, a JaccardSimilarity function, a ContainmentSimilarity function, a LongestCommonSequence function, a LongestCommonSubstring function.

17. The computer program product of claim 11, wherein output of the classifier is used to determine the classification in response to inputting any one or more of the following, extracted or derived from the candidate entity-user entity pair, into the machine learning model: a name, an email domain, a username, a similarity score, or connection data that is associated with a source of the candidate entity data and the online service.

18. The computer program product of claim 11, wherein the machine learning model comprises any one or more of the following types of machine learning models: logistic regression, decision tree, random forest, support vector machine, gradient boosting.

19. The computer program product of claim 11, wherein the candidate entity data is received in response to an address book import operation initiated by a user of the online service.

20. A computer program product comprising one or more non-transitory computer-readable storage media comprising instructions which, when executed by one or more processors, cause the one or more processors to perform operations comprising:
receiving a set of digital inputs;
wherein the set of digital inputs comprises a candidate entity-user entity pair that includes candidate entity data and user entity data;
wherein the user entity data has been extracted from a node of an online service;
wherein an exact match has not been found between the candidate entity data and the user entity data;
in response to the set of digital inputs, outputting models of the candidate entity data and the user entity data, respectively;
wherein the models indicate weight values assigned to text in the candidate entity data and weight values assigned to text in the user entity data, respectively;
calculating a similarity score using the models;
in response to the similarity score matching a threshold, inputting the candidate entity-user entity pair to a classifier to produce a classification;
wherein the classifier uses a machine learning model that has been trained using features derived from previously-analyzed candidate entity-user entity pairs;
wherein the classification indicates a likelihood that a match has been found between the candidate entity data and the user entity data;
causing the online service to act on the classification, including, in response to the classification indicating that the candidate entity data matches the user entity data, causing an online service to transmit a first electronic message to an address of a source of the candidate entity data and not transmit a second electronic message to an address in the candidate entity data.

* * * * *